United States Patent [19]

Makita

[11] Patent Number: 5,159,624

[45] Date of Patent: Oct. 27, 1992

[54] COMMUNICATION SYSTEM FOR TRANSMITTING TO A PORTABLE RECEIVER DATA INDICATIVE OF RECEIVED IMAGE OR VOICE SIGNALS

[75] Inventor: Hiroshi Makita, Koraku, Japan

[73] Assignee: Sharp Kabushiki Kaisha, Osaka, Japan

[21] Appl. No.: 601,121

[22] Filed: Oct. 22, 1990

[30] Foreign Application Priority Data

Oct. 23, 1989 [JP] Japan .................................. 1-275599

[51] Int. Cl.$^5$ .......................................... H04M 11/00
[52] U.S. Cl. ...................................... 379/57; 379/67; 379/100
[58] Field of Search ....................... 379/57, 58, 67, 88, 379/89, 100; 340/825.44

[56] References Cited

U.S. PATENT DOCUMENTS 4,961,216 10/1990 Baehr et al. ............................ 379/67
5,014,296 5/1991 Saigano ................................ 379/100

FOREIGN PATENT DOCUMENTS 0178730 9/1985 Japan .
0001364 1/1989 Japan ................................... 379/100
0013050 1/1990 Japan .................................... 379/57

OTHER PUBLICATIONS

CCITT, The International Telegraph and Telephone Consultative Committee recommendations T.0–T.63, "Terminal Equipment and Protocols for Telematic Services", vol. VII–Fascicle VII.3, Melbourne, 14–25 Nov. 1988, pp. 116–117.

Primary Examiner—James L. Dwyer
Assistant Examiner—Dwayne D. Bost

[57] ABSTRACT

A communication system is disclosed having a portable radio called receiver and a communication apparatus for calling this receiver. The portable radio called receiver includes a display and a tone generating circuit. The communication apparatus includes a determination circuit, a control circuit, a voice signal recording device, a facsimile device, a memory, and a data processing circuit. The determination circuit determines whether a signal entered through a telephone line is a facsimile signal or a voice signal. The memory stores display data indicating the reception of an image signal, display data indicating the reception of a voice signal, and telephone number data of the portable radio called receiver. The control circuit is responsive to the output of the determination circuit to select one of the plurality of display data stored in the memory. The data processing circuit modulates the calling number of the portable radio called receiver and the selected display data and transmits the same on the telephone line. With such a structure, the display of the portable radio called receiver can display whether the received signal of the communication apparatus is an image signal or a voice signal.

19 Claims, 6 Drawing Sheets

COMMUNICATION SYSTEM FOR TRANSMITTING TO A PORTABLE RECEIVER DATA INDICATIVE OF RECEIVED IMAGE OR VOICE SIGNALS

BACKGROUND OF THE INVENTION

1. Field of the Invention

The present invention relates to a portable radio called receiver comprising a display and a tone generating circuit, and a communication apparatus sending display data for informing the presence of a message.

2. Description of the Background Art

Recently, portable radio called receivers comprising a display and a tone generating circuit have been developed and put into practical use. Such receiver is often referred to as "a pocket bell" and a display thereof is often implemented with a liquid crystal display panel. In this specification, such a portable radio called receiver is also referred to as "a pocket bell" for simplicity. An automatic answering telephone equipment has also been developed for sending display data informing the presence of a message to a pocket bell. Furthermore, a communication apparatus has been developed in which an automatic answering telephone equipment and a facsimile device are integrated. Such a communication apparatus comprises a memory storing the calling number of the pocket bell and the display data to be displayed in the pocket bell. The function of the automatic answering telephone equipment is set after the calling number of the pocket bell and one kind of display data are stored in the memory. This allows for the automatic reception of the communication from the caller. When the communication from the caller is a voice signal, the voice of the caller is recorded, whereas image data is recorded if a facsimile signal is received.

The function of the automatic answering telephone equipment will be explained in further detail.

When the caller hangs up the line to end the communication, the communication apparatus will read out the telephone number of the pocket bell registered previously in the memory to carry out the calling operation, followed by the transmission of the display data. The pocket bell is responsive to the call from the communication apparatus to generate a predetermined tone. This generated tone notifies the carrier of the pocket bell that the pocket bell has been called. The pocket bell displays the display message on the display. Thus, the carrier of the pocket bell will be informed that the communication apparatus has received a communication from a caller. The carrier of the pocket bell may telephone the communication apparatus from a nearby telephone and enter an identification number to request the transfer of the message signal, for example. The communication apparatus is responsive to the entry of the identification number to send the recorded message of the caller. Thus, the carrier of the pocket bell can acquire the message of the caller.

The above mentioned communication apparatus transmits one kind of display data registered in advance upon receiving a communication from a caller, irrespective of whether it is a voice signal or a facsimile signal. There was an inconvenience that the carrier of the pocket bell could not identify whether the communication is a voice communication or a facsimile communication.

Furthermore, in the case where the caller records a message in the communication apparatus requesting the carrier of the pocket bell to call by telephone, the carrier of the pocket bell had to perform the following operations. That is to say, the carrier of the pocket bell must first telephone the communication apparatus to listen to the message of the caller and hang up the telephone. Then, he/she must telephone the caller. This means that there is some period of time since the calling of the communication apparatus till the carrier of the pocket bell actually calls the caller. This is time consuming and laborious.

SUMMARY OF THE INVENTION

In view of the foregoing, an object of the present invention is to provide a communication system that can notify whether the communication signal from the caller is a facsimile signal or a voice signal.

Another object of the present invention is to reduce the time period starting from the calling operation by the caller until the start of talking between the caller and the pocket bell carrier, in a communication system.

A further object of the present invention is to reduce the number of times the pocket bell carrier has to telephone, in a communication system.

In summary, the communication system in accordance with the present invention comprises a pocket bell including a display and a tone generating circuit, and a communication apparatus transmitting the calling signal and the display data to the pocket bell. The communication system comprises a manual operation circuit, a determination circuit, a memory, a control circuit, a facsimile device, an automatic answering telephone equipment, and a data processing circuit. The manual operation circuit stores the display data for notifying the reception of facsimile signals or voice signals, and the calling number of the pocket bell in the memory. The determination circuit is connected to a telephone line, making the determination whether the transmitted signal is a facsimile signal or a voice signal in response to the calling tone signal applied from the telephone line. The control circuit is responsive to the determination signal of the determination circuit to enable the facsimile device or the automatic answering telephone equipment, whereby the display data corresponding to the type of the received signal is read out in response to the communication end signal. The data processing circuit modulates the read out display data and provides the same on the telephone line.

In operation, the communication apparatus transmits the calling signal of the pocket bell and the display data indicating the type of the received signal. The reception circuit of the pocket bell receives the calling signal and the display data. The tone generating circuit generates a tone in response to the reception of the calling signal to inform the carrier of the pocket bell that there is a message. The display displays the type of the received signal according to the display data. The pocket bell carrier therefore does not have to telephone when facsimile signals are received.

In another aspect of the present invention, a detection circuit is added, with the manual operation circuit and the control circuit improved as explained hereinafter. The manual operation circuit stores the calling number of the pocket bell, the display data, and an identification number determined by a certain caller in the memory. The detection circuit detects the identification number. The control circuit is responsive to the detection signal to allow the writing into the memory, followed by the writing in of the message data entered after the identification number is entered in the memory.

In operation, the communication apparatus transmits the calling number of the pocket bell and the message data for display from a certain caller. The reception circuit of the pocket bell receives the calling signal and the message data for display. The tone generating circuit generates a tone in response to the reception of the calling signal to inform the pocket bell carrier that there is a message. The display displays the message data. The carrier of the pocket bell will be informed of the message contents by the displayed message data, eliminating the need to telephone the communication apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DESCRIPTION OF THE PREFERRED EMBODIMENTS

Figure 1:
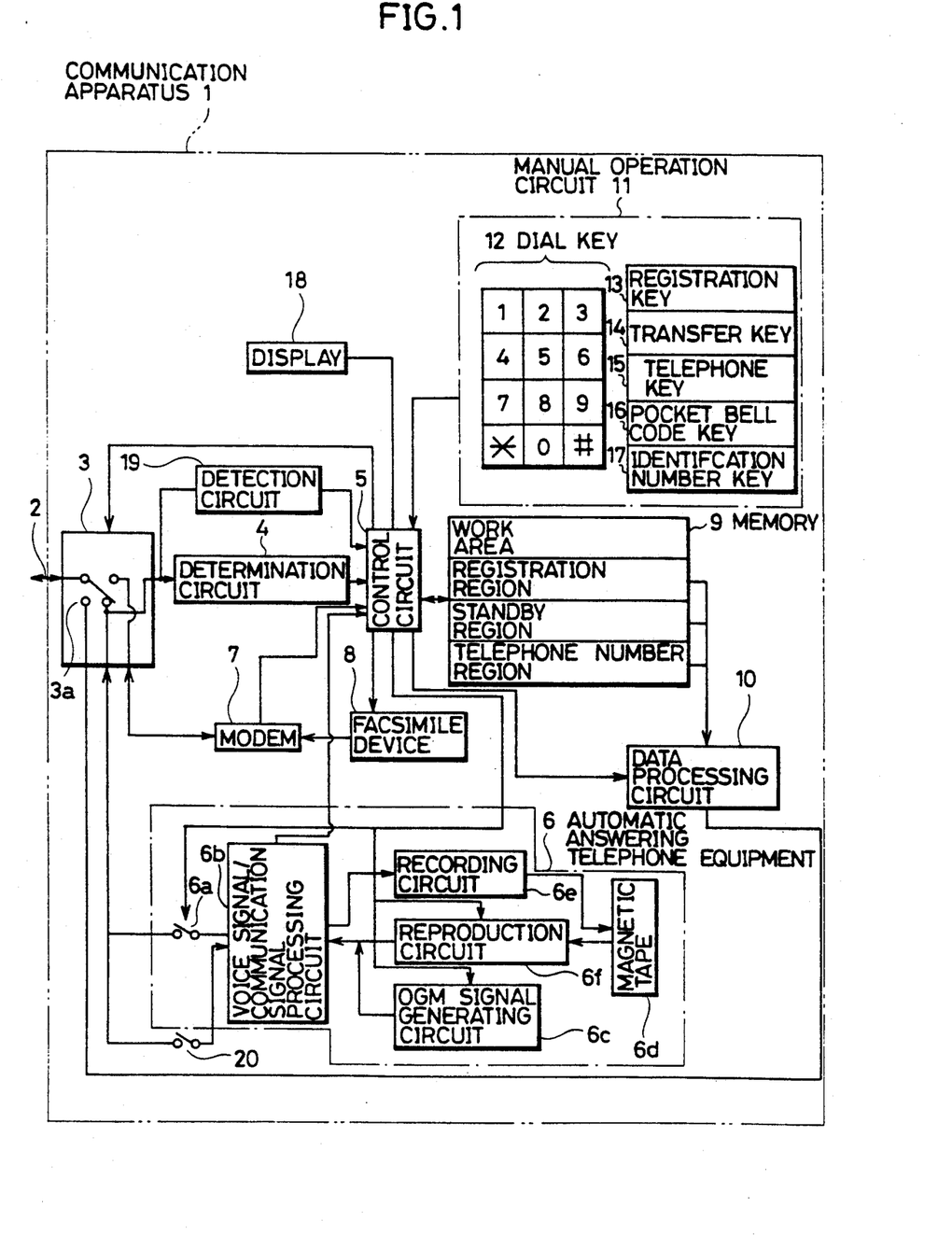
FIG. 1 is a block diagram showing a communication apparatus 1 of the communication system in accordance with an embodiment of the present invention.

FIG. 1 is a block diagram showing an embodiment of communication apparatus 1 of the communication system in accordance with the present invention. Communication apparatus 1 comprises a network control unit 3, a determination circuit 4, a detection circuit 19, a control circuit 5, an automatic answering telephone equipment 6, a modem 7 for modulating/demodulating facsimile signals, a facsimile device 8, a memory 9, a data processing circuit 10, a manual operation circuit 11, and a display 18.

Network control unit 3 is connected to a telephone line 2. This network control unit 3 includes a relay 3a and an input/output transformer (not shown). Relay 3a controls the connection between telephone line 2 and determination circuit 4, modem 7, automatic answering telephone equipment 6, and data processing circuit 10.

Determination circuit 4 is responsive to the calling tone signal transmitted from the calling station to identify a facsimile signal or a voice signal. The calling tone signal is a signal that is first transmitted when a facsimile signal is transmitted. Detection circuit 19 detects the entry of a predetermined identification number of a certain caller. The determination result of determination circuit 4 and the detected result of detection circuit 19 are provided to control circuit 5.

Control circuit 5 operates automatic answering telephone equipment 6 when the determination result is a voice signal, and operates the facsimile device when the determination result is a facsimile signal.

The automatic answering telephone equipment 6 comprises a relay 6a, a voice signal/communication signal processing circuit 6b, an out-going message signal generating circuit 6c, a recording circuit 6e for recording the voice signals onto a magnetic tape 6d, and a reproduction circuit 6f. Relay 6a is turned on by control circuit 5 to connect telephone line 2 to voice signal/communication signal processing circuit 6b. Voice signal/communication signal processing circuit 6b converts the voice signals into voice. The voice signal/communication signal processing circuit 6b is responsive to the disconnection of telephone line 2 to detect termination of the communication.

Out-going message signal generating circuit 6c provides to voice signal/communication signal processing circuit 6b a message signal for informing that the person who is requested to talk is not available.

Modem 7 demodulates the facsimile signal and provides the same to facsimile device 8. Modem 7 is responsive to the disconnection of telephone line 2 to detect termination of the communication.

Memory 9 comprises a registration region, a standby region, a telephone number region, and a work area. The registration region stores the display data to be transmitted to pocket bell 21. The standby region is a region where the display data registered in the registration region is on standby, when an identification number is entered. The telephone number region stores the telephone number of pocket bell 21 and identification numbers. The standby, registration and telephone number regions may be random access memories. The work area stores the program to be executed by control circuit 5. The work area may be a read only memory The data processing circuit 10 is responsive to the output of control circuit 5 to read out the display data from the registration region of memory 9. The read out display data is modulated into dual tone multi-frequency signals to be transmitted to telephone line 2. The company offering the pocket bell service emits from a radio facility the modulated radiowave according to the modulated display data and telephone number of the pocket bell.

The manual operation circuit comprises dial keys 12, a registration key 13, a transfer key 14, a telephone key 15, a pocket bell number key 16, and an identification number key 17. These keys are operated in registering the identification number and in registering the display data to be transmitted to pocket bell 21. The display 18 comprises a liquid crystal display device, for example, in which the operational contents of manual operation circuit 11 are displayed.

For example, at the time of registering the above mentioned identification number or display data, the entered identification number or display data is displayed. This allows the confirmation of the registered contents.

Figure 2:
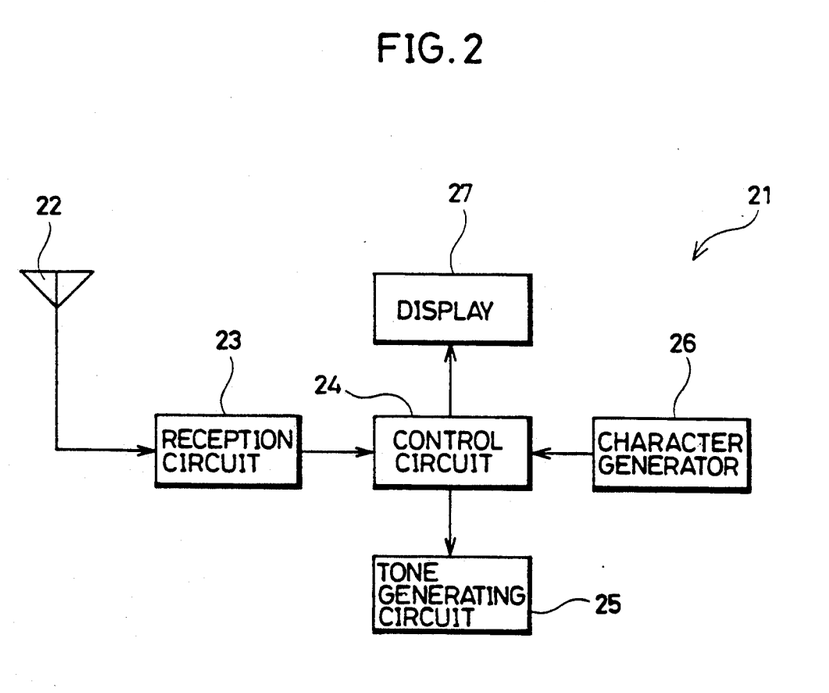
FIG. 2 is a block diagram of the pocket bell 21.

FIG. 2 is a block diagram of pocket bell 21. Pocket bell 21 comprises an antenna 22, a reception circuit 23, a control circuit 24, a tone generating circuit 25, a character generator 26, and a display 27. Data received by antenna 22 is detected and demodulated in reception circuit 23. The demodulated received data is applied to control circuit 24. Control circuit 24 is responsive to the output of reception circuit 23 to operate tone generating circuit 25 for generating a predetermined tone. Thus, the carrier of the pocket bell is informed that pocket bell 21 is called. Control circuit 24 is responsive to the received display data to display in display 27 whether the signal received by communication apparatus 1 is a facsimile signal or a voice signal. Character generator 26 has character data and the like stored therein. Control circuit 24 carries out the display in accordance with the character data. The display 27 is implemented with a liquid crystal display device, for example, in which the number of characters that can be displayed is set in advance. In the present embodiment, the number of characters to be displayed is set to 9 characters.

Figure 3:
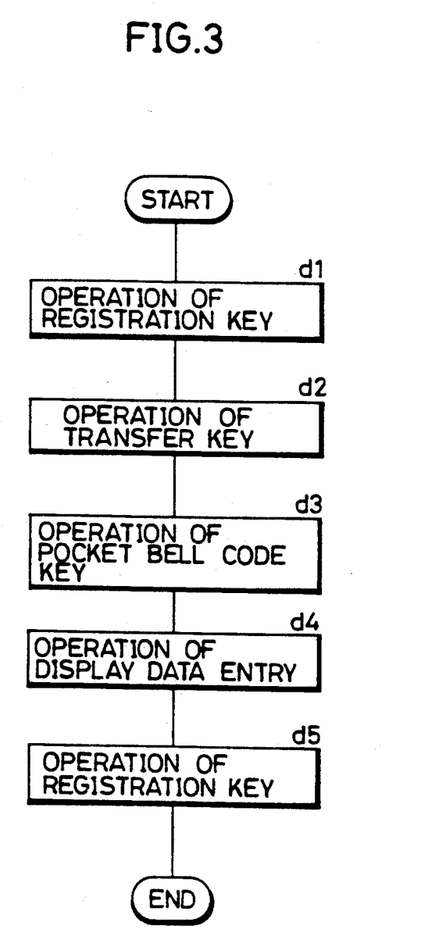
FIG. 3 is a flow chart for explaining the operational procedures of registering the display data in communication apparatus 1.

FIG. 3 is a flow chart for explaining the operational procedures for registering display data to be transmitted to pocket bell 21. At step d1, registration key 13 is operated. Transfer key 14 is operated at step d2. At step d3, pocket bell number key 16 is operated. At step d4, display data is entered. At step d5, registration key 13 is operated again. By the above mentioned operation procedures, the display data entered at step d4 is stored in the registration region of memory 9. In the present embodiment, the display data is "0 1 2 3 4 5 6 7 8". (refer to FIG. 8 (1)).

Figure 4:
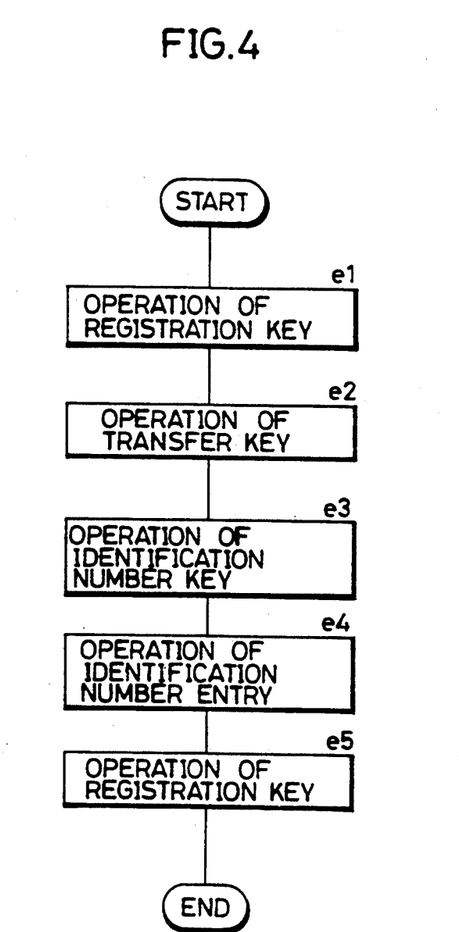
FIG. 4 is a flow chart for explaining the operational procedures in registering an identification number in the communication apparatus 1.

FIG. 4 is a flow chart for explaining the operational procedures in specifying an identification number. At step e1, registration key 13 is operated. At step e2, transfer key 14 is operated. At step e3, identification number key 17 is operated. At step e4, the identification numbers are entered. At step e5, registration key 13 is again operated. By the above mentioned operational procedures, the identification number is registered which is necessary in registering the display data by the caller. In the present embodiment, the identification number is "1 2 3".

Figure 5:
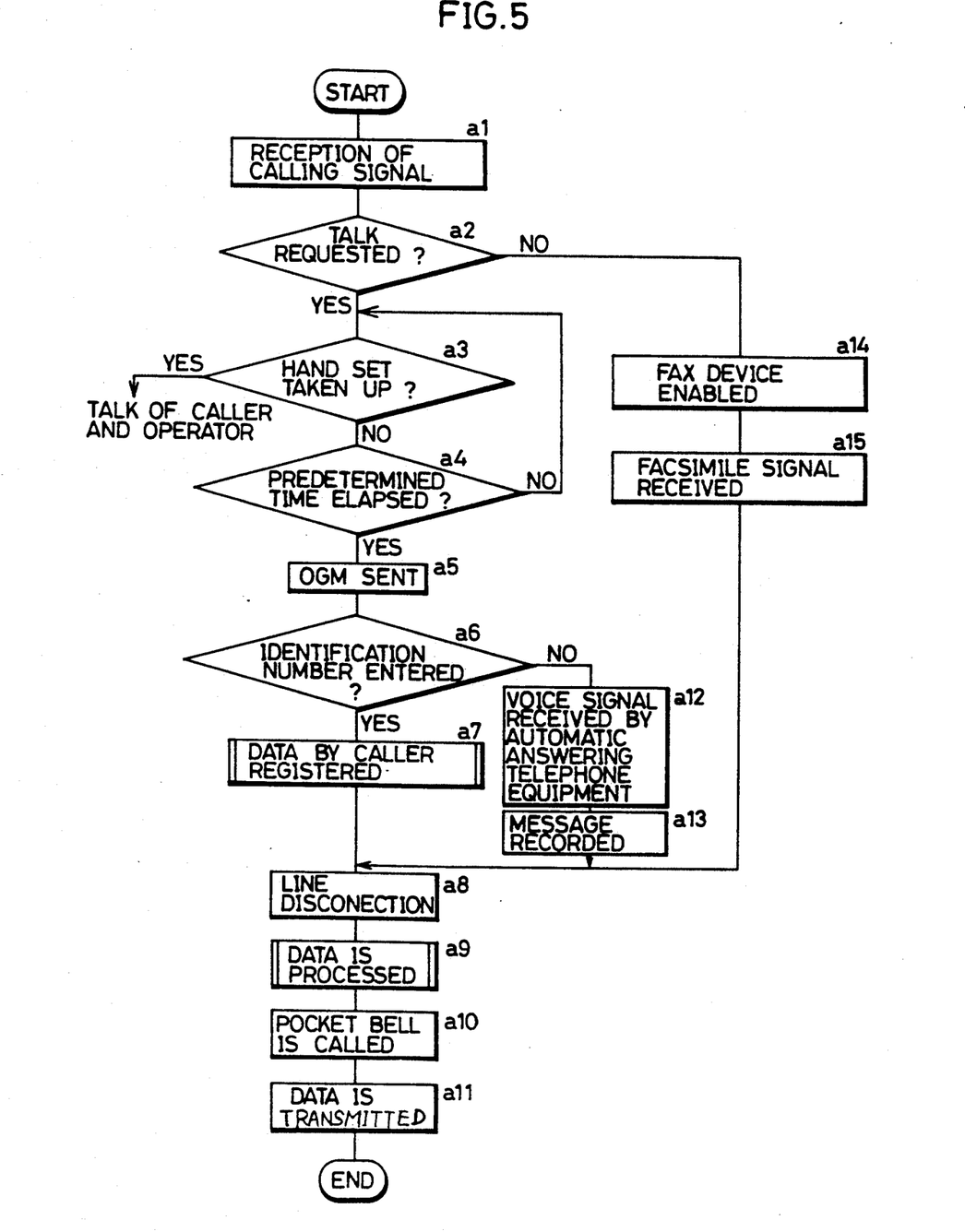
FIG. 5 is a flow chart for explaining the operation of the communication apparatus 1.

FIG. 5 is a flow chart showing the operation of communication apparatus 1. At step a1, the calling signal from the caller is received. At step a2, determination is made according to the calling tone signal whether the communication from the caller is a talk request or not. When there is no calling tone signal at step a2, that is to say, when talk is requested, determination is made at step a3 whether the hand-set is taken up or not. When the hand-set is taken up, hook switch 20 is turned on to connect the hand-set and the telephone line. The caller talks with the operator.

When the hand-set is not taken up at step a3, determination is made at step a4 whether a predetermined time period has elapsed or not. When a predetermined time period has elapsed at step a4, OGM (Out-Going Message) is transmitted at step a5. OGM is a message previously recorded in the OGM generating circuit 6c of automatic answering telephone equipment 6. For example, the message such as "I am not available now. . . . Please leave your message after the bleep." may be recorded. At this time, communication apparatus 1 is at a waiting state for the entry of voice signals or an identification number from the caller.

At step a6, determination is made whether the identification number is entered or not according to the output of detection circuit 19. The caller enters the identification number of "1 2 3" by operating the "#" key, the "1" key, the "2" key, the "3" key, and the "#" key in sequence. When the identification number is entered, data from the caller is registered in the registration region of memory 9 at step a7, and operation proceeds to step a8. The caller operates the dial keys in the order of "0 6 4 7 2 9 9 9 9", for example, and finally enters the "#" key. Thus, the message data for display is entered. The process of registering message data from the caller into memory 9 will be explained later.

If an identification number is not entered at step a6, that is to say, if voice signal is entered, the voice signal from the caller is received in automatic answering telephone equipment 6 at step a12. At step a13, the voice signal from the caller, a message for example, is recorded, and operation proceeds to step a8.

If talk is not requested at step a2, that is to say, if a facsimile signal is received, facsimile device 8 is enabled at step a14. After facsimile device 8 receives the facsimile signal at step a15, operation proceeds to step a8.

At step a8, the hang-up of the line by the caller is detected by modem 7 or voice signal/communication signal 15 processing circuit 6b, whereby the display data to be transmitted to the pocket bell 21 is processed at step a9. Data processing of the display data will be explained afterwards. After the processing of the display data to be transmitted to pocket bell 21 is ended in step a9, pocket bell 21 is called at step a10. At step a11, the display data is transmitted.

Figure 6:
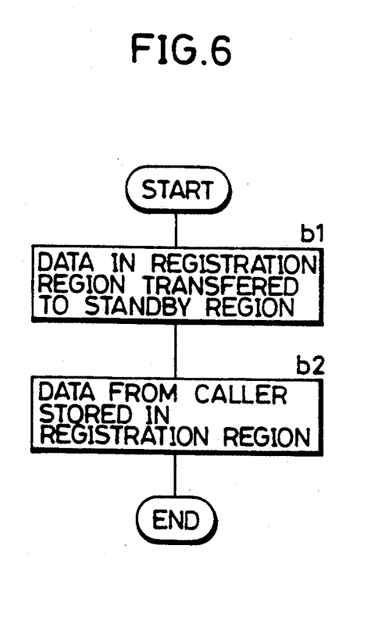
FIG. 6 is a flow chart for explaining the registration procedures of the data in step a7 of FIG. 5.

FIG. 6 is a flow chart for explaining the registration process of the data from the caller at step a7 of FIG. 5. At step b1, data in the registration region is transferred to the standby region. At step b2, data from the caller is stored in the registration region. Because the data from the caller is stored in the registration region after the data in the registration region is transferred to the standby region, the display data registered previously in the registration region by the carrier of pocket bell 21 will not be erased.

Figure 7:
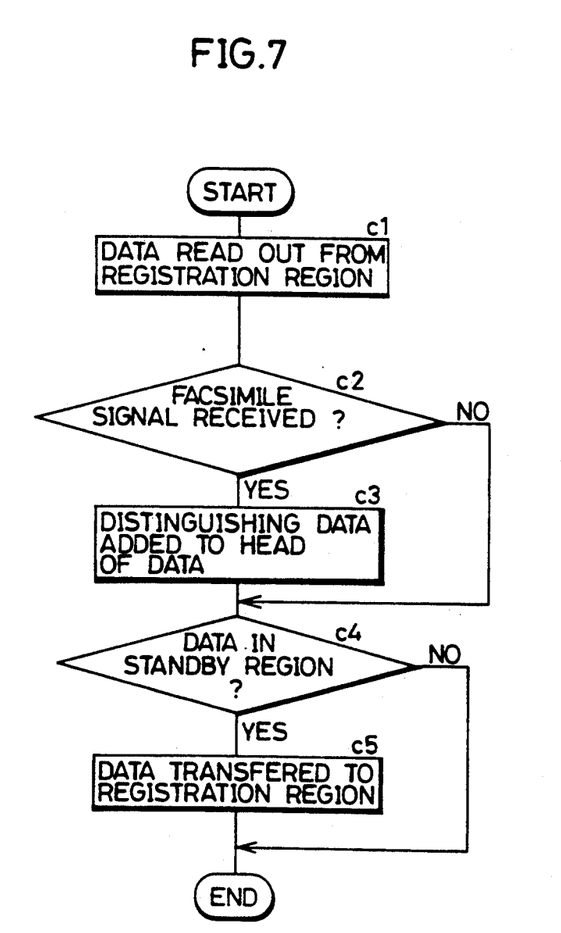
FIG. 7 is a flow chart for explaining data processing in step a9 of FIG. 5.

FIG. 7 is a flow chart for explaining the data processing of step a9 of FIG. 5. At step c1, data is read out from the registration region. At step c2, determination is made whether a facsimile signal is received or not. If a facsimile signal is received, a distinguishing data for distinguishing a facsimile signal from a voice signal is added to the head of the data read out from the registration region at step c3. The display 27 of the pocket bell displays the display data according to the data having a distinguishing data added to the beginning. In this embodiment, the data in the registration region is "0 1 2 3 4 5 6 7 8" and the distinguishing data for a facsimile is "-". Since the data (DTMF signal) corresponding to "-" in Model RC-101 Display Pocket Bell (a product of Nippon Telegraph AND Telephone Corporation), for example, is "* 2", the transmitted data is "* 2 0 1 2 3 4 5 6 7 8". A display data indicating a facsimile signal reception or a voice signal reception may be stored in memory 9 in advance to be selected.

If a facsimile signal is not received at step C2, that is to say, if a voice signal is received, operation directly proceeds to step c4. Determination is made whether there is or is not data in the standby region at step c4. If there is a data, data is transferred to the registration region at step c5. If there is no data in the standby region at step c4, the process is ended. Thus, when there is communication from a caller who does not know the identification number, after a previous caller registers the display data, the display data previously specified in the registration region of memory by the carrier is transmitted to pocket bell 21.

Figure 8:
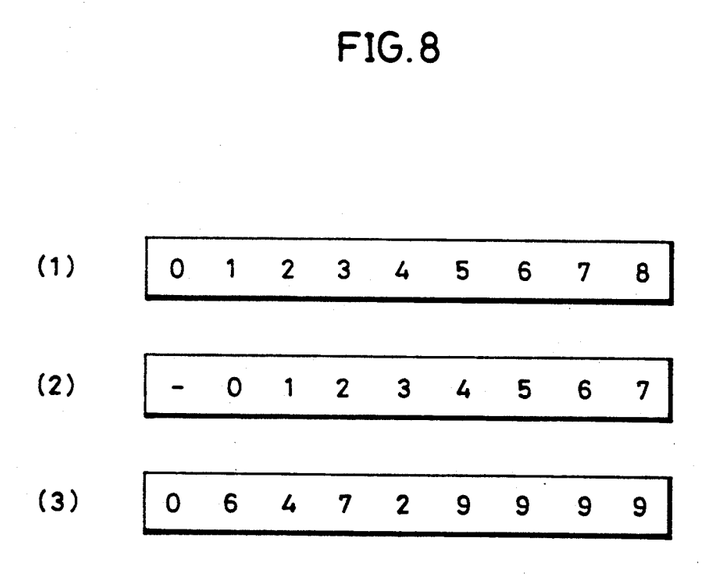
FIG. 8 is a diagram of display examples of the display section 27 of the pocket bell 21.

FIG. 8 is a diagram showing examples of display section 27 of pocket bell 21. When a voice signal from the caller is received, the display data of FIG. 8 (1) previously registered in the registration region is displayed in display section 27. When a facsimile signal from the caller is received, the data previously registered in the registration region is displayed in display section 27 having a prefix of "-", as shown in FIG. 8 (2). At this time, the last data "8" is not displayed because the number of characters that can be displayed in display section 27 is 9. When a display data is registered by a caller, this display data registered by the caller such as the telephone number of the caller is displayed as in FIG. 8 (3).

It is understood from the aforementioned embodiment that the data to be displayed on display section 27 in pocket bell 21 can be changed at the time of a facsimile signal reception from a voice signal reception. The carrier of pocket bell 21 will telephone communication apparatus 1 to listen to the message of the caller recorded in automatic answering telephone equipment 6, only when a voice signal is received. This will eliminate wasteful actions of the pocket bell carrier and is more convenient in comparison with conventional communication systems.

Because the caller can register the display data to be transmitted to pocket bell 21 in communication apparatus 1, the carrier of pocket bell 21 can be informed of the contents requested by the caller by regarding display section 27 of pocket bell 21. If the registered display data is a telephone number, the pocket bell carrier will understand that the caller is requesting a telephone call.

It is therefore possible to omit the trouble of the carrier to telephone communication apparatus 1 to listen to the message from the caller. The trouble to find out the telephone number of the caller can also be omitted because it is displayed on display section 27 of pocket bell 21.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of automatically transmitting signal identification data from a voice/image communication system, to a portable hand-held receiver via a wireless transmitter, under direction of control means, comprising the steps of:
   storing in memory mean a calling number of the portable hand-held receiver and display data to be displayed by the portable hand-held receiver, entered into the voice/image communication system by system user via input means;
   determining, in signal determination means, whether a received signal is a voice signal or an image signal and generating a determination signal indicative thereof;
   enabling either automatic voice signal answering means or image signal receiving means in accordance with the determination signal; and
   transmitting to the wireless transmitter along a transmission line, when the received signal terminates, the signal identification data, which comprises the calling number of the portable hand-held receiver, the display data, and voice indication data when the received signal is a voice signal or image indication data when the received signal is an image signal.

2. The method of automatically transmitting signal identification data from a voice/image communication system to a portable hand-held held receiver of claim 1, said step of storing further comprising storing in the memory means caller identification codes, indicative of authorized callers of the voice/image communication system, entered by the system user via the input means,
   said step of determining further comprising determining whether the received signal includes an identification code which matches one of the stored caller identification codes, and
   said step of transmitting further comprising transmitting
       the calling number, the display data and the voice indication data when a voice signal is received and recorded by the automatic voice signal answering means,
       the calling number, the voice indication data and message data, received along the transmission line from an authorized caller after entry of an identification code which matches one of the caller identification codes, and
       the calling number, the display data, and the image indication data when an image signal is received and reproduced by the image signal receiving means.

3. The method of automatically transmitting signal identification data from a voice/signal communication system to a portable hand-held receiver of claim 2, the automatic voice signal answering means automatically answering a telephone call and the image signal receiving means receiving a facsimile signal, wherein the transmission line is a telephone line.

4. A communication system including a communication apparatus and a portable receiver, the communication apparatus receiving voice and image data and comprising:
   relay means, coupled to a transmission line, for receiving and sending voice and image data along the transmission line and for sending system data to the portable receiver;
   determination means, coupled to said relay means, for determining whether received data comprises voice data or image data and for generating a determination signal indicative thereof;
   image transceiving means, coupled through modem means to said relay means, for receiving and transmitting image data along the transmission lien through said relay means;
   automatic answering means, coupled to said relay means, for receiving and recording voice data, received along the transmission line, in absence of manual operation of the communication apparatus by a system user;
   control means, coupled to said determination means, for enabling either said image transceiving means on said automatic answering means and for directing said relay means to couple received data from the transmission line to either said image transceiving means or said automatic answering means, in accordance with said determination signal;

data processing means, coupled to memory means and said control means, for selecting and modulating the system data, which is stored in said memory means, and for transmitting the modulated system data along the transmission line through said relay means upon termination of reception of voice or image data, under direction of said control means in accordance with said determination signal; and manual operation means, coupled to said control means, for entering user data into the communication apparatus, the user data comprising a calling number of the portable receiver, display data to be displayed by the portable receiver, and caller identification codes, the system data comprising the calling number, the display data and an image indication data when said determination means determines that the received data is image data, the calling number, the display data and a voice indication data when voice data is received and recorded by said automatic answering means, and the calling number, the voice indication data and message data, which is received along the transmission line from a system caller after entry of an identification code which matches one of the caller identification codes.

5. The communication system of claim 4, wherein the communication apparatus transmits the modulated system data along the transmission line to a radio transmitter to be wirelessly transmitted to the portable receiver.

6. The communication system according to claim 4, wherein said memory means comprises a read only memory and a random access memory, said random access memory storing the calling number of the portable receiver, the display data, the caller identification codes, and the message data, and said read only memory storing an operation program for the communication system.

7. The communication system according to claim 6, wherein said random access memory comprises a telephone number region for storing the calling number of the portable receiver and the caller identification codes, a registration region for registering the display data, and a standby region where the display data is on standby.

8. The communication system according to claim 7, wherein said memory means is responsive to entry of the matching identification number by the system caller, under direction of said control means, to transfer the display data registered in the registration region into the standby region and for writing the next entered message data for display into the registration region.

9. The communication system including a communication apparatus and a portable receiver, the communication apparatus receiving voice and image data and comprising:

a relay means, coupled to a transmission line, for receiving and sending voice and image data along the transmission line and for sending identification data to the portable receiver, the identification data being indicative or whether the communication apparatus has received voice or image data;

determination means, coupled to said relay means, for determining whether received data comprises voice data or image data and for generating a determination signal indicative thereof;

image transceiving means, coupled through modem means to said relay means, for receiving and transmitting image data along the transmission line through said relay means;

automatic answering means, coupled to said relay means, for receiving and recording voice data, received along the transmission line, in absence of manual operation of the communication apparatus by a system user;

control means, coupled to said determination means, for enabling either said image transceiving means or said automatic answering means and for directing said relay means to couple received data from the transmission line to either said image transceiving means or said automatic answering means, in accordance with said determination signal; and data processing means, coupled to memory means and said control means, for selecting and modulating the identification data, which is stored in said memory means, and for transmitting the modulated identification data along the transmission line through said relay means upon termination of reception of voice or image data, under direction of said control means in accordance with said determination signal, the identification data comprising a calling number of the portable receiver and display data indicative of whether voice or image data has been received, the modulated identification data being transmitted to the portable receiver for display.

10. The communication system according to claim 9, wherein the transmission line is a telephone line.

11. The communication system according to claim 9, wherein said data processing means comprises dual tone multi-frequency modulating means for modulating the identification data into dual tone multi-frequency signals.

12. The communication system according to claim 9, wherein said display means comprises a liquid crystal display.

13. The communication system according to claim 9, wherein said image transceiving means comprises a facsimile device.

14. The communication system according to claim 9, wherein said automatic answering means comprises:

message signal generating means for transmitting an outgoing message signal along the transmission line through said relay means to a system caller;

voice signal recording means for recording the voice data received along the transmission line from the system caller; and replay means, responsive to a request signal transmitted by the system user along the transmission line, for transmitting the recorded voice data to the system user along the transmission line.

15. The communication system according to claim 9, wherein said memory means comprises a read only memory and a random access memory, said random access memory storing the calling number of said portable receiver and the display data, and said read only memory storing an operation program for the communication system.

16. The communication system of claim 9, wherein the communication apparatus transmits the modulated identification data along the transmission line to a radio transmitter to be wirelessly transmitted to the portable receiver.

17. The communication system according to claim 16, wherein the portable receiver comprises:
 a receiving antenna for receiving the modulated identification data from said radio transmitter;
 demodulating means, coupled to said receiving antenna, for demodulating the received modulated identification data and for thereafter generating a calling signal and the display data;
 tone generating means for generating an audio warning;
 display means for displaying the display data; and
 receiver control means, responsive to the calling signal, for enabling said tone generating means and for directing display of the display data by said display means.

18. The communication system according to claim 16, wherein the communication apparatus further comprises manual operation means, coupled to said control means, for designating the calling number in accordance with calling information input by the system user, the calling number thereafter being stored in said memory means under direction of said control means.

19. The communication system according to claim 18, wherein said manual operation means comprises push-button keys, a plurality of functional keys for entering the display data and the calling number of the portable receiver, and system display means for confirming entry of the calling number and the display data.

* * * * *